Figure 1:
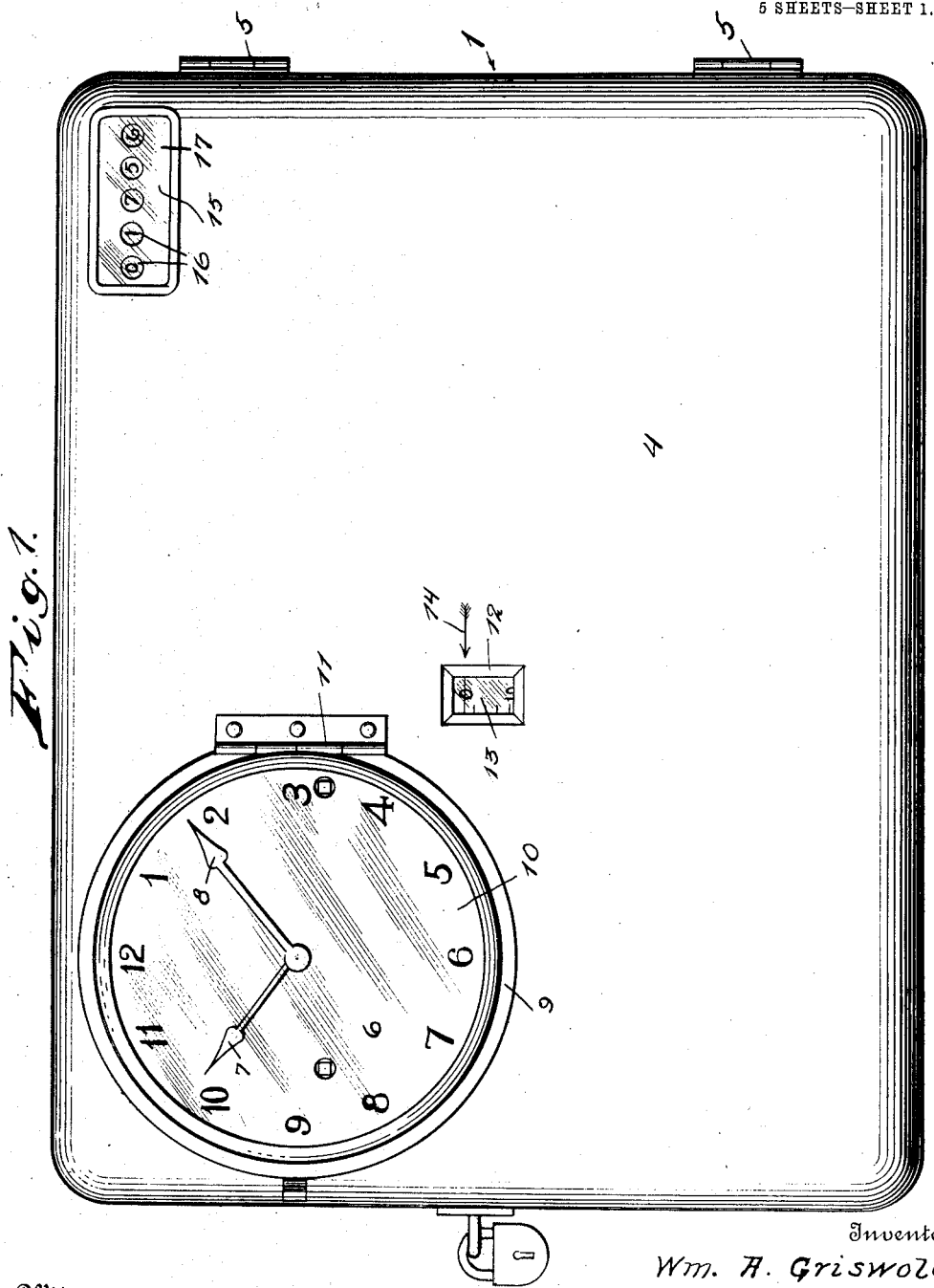

W. A. GRISWOLD.
SPEED AND DISTANCE INDICATING AND RECORDING DEVICE.
APPLICATION FILED OCT. 31, 1911.

1,043,825.

Patented Nov. 12, 1912.
5 SHEETS—SHEET 1.

Witnesses
J. Milton Jester
B. V. McIlwain

Inventor
Wm. A. Griswold

By C. L. Parker
Attorney

W. A. GRISWOLD.
SPEED AND DISTANCE INDICATING AND RECORDING DEVICE.
APPLICATION FILED OCT. 31, 1911.
1,043,825.
Patented Nov. 12, 1912.
5 SHEETS—SHEET 2.
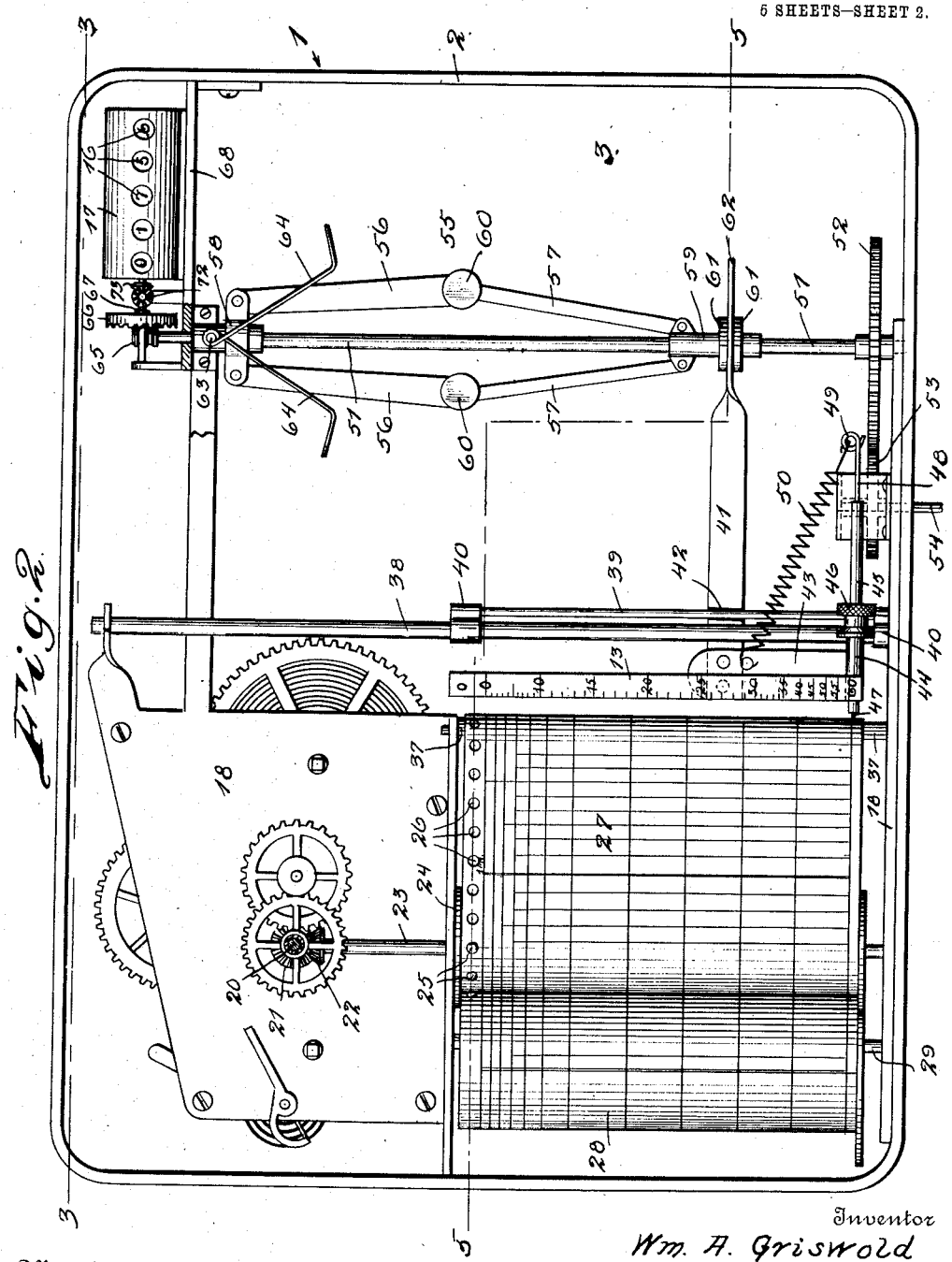

W. A. GRISWOLD.
SPEED AND DISTANCE INDICATING AND RECORDING DEVICE.
APPLICATION FILED OCT. 31, 1911.
1,043,825.
Patented Nov. 12, 1912.
5 SHEETS—SHEET 3.
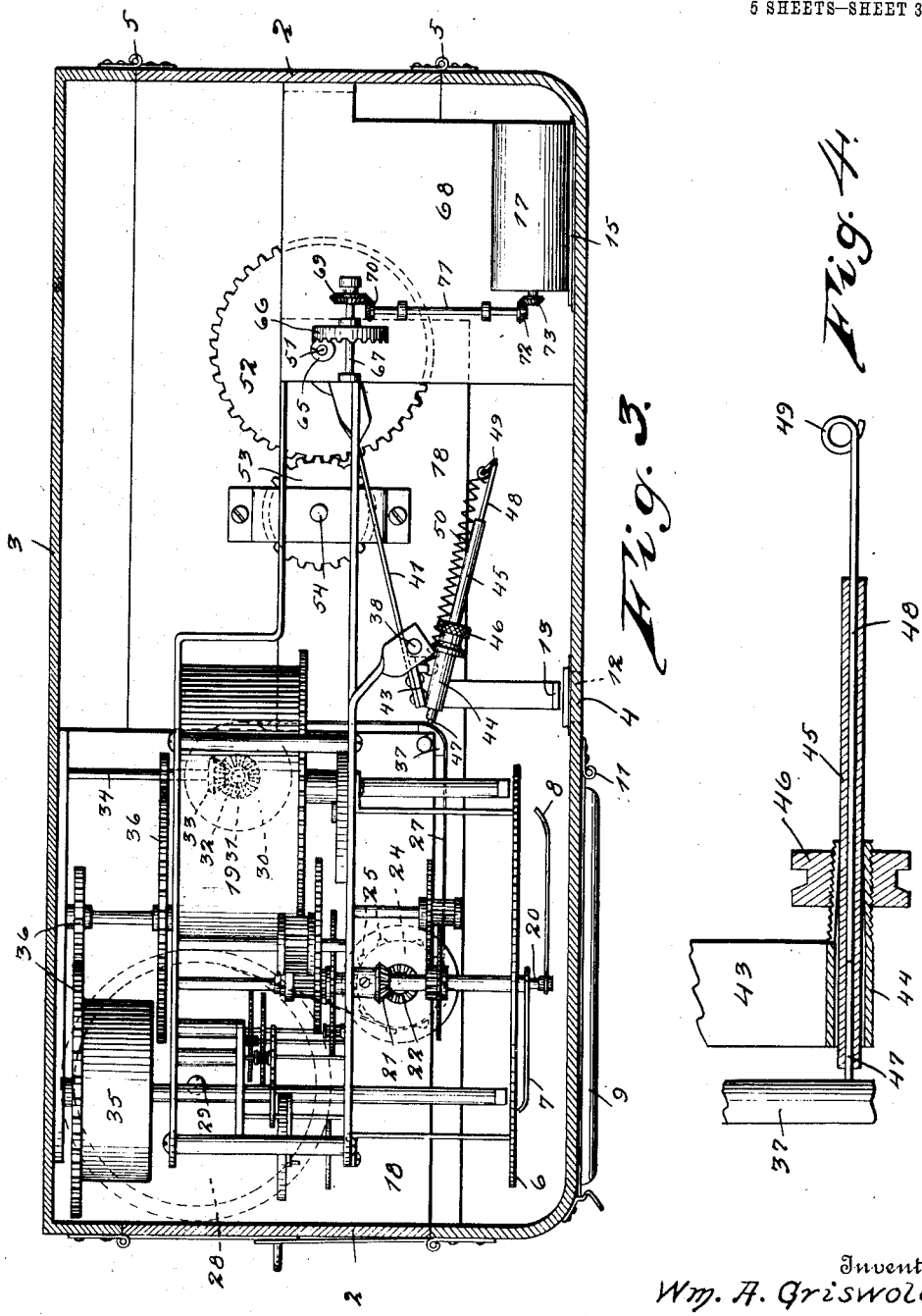
Witnesses
Inventor
Wm. A. Griswold.
By
Attorney W. A. GRISWOLD.
SPEED AND DISTANCE INDICATING AND RECORDING DEVICE.
APPLICATION FILED OCT. 31, 1911.
1,043,825.
Patented Nov. 12, 1912.
5 SHEETS—SHEET 4.
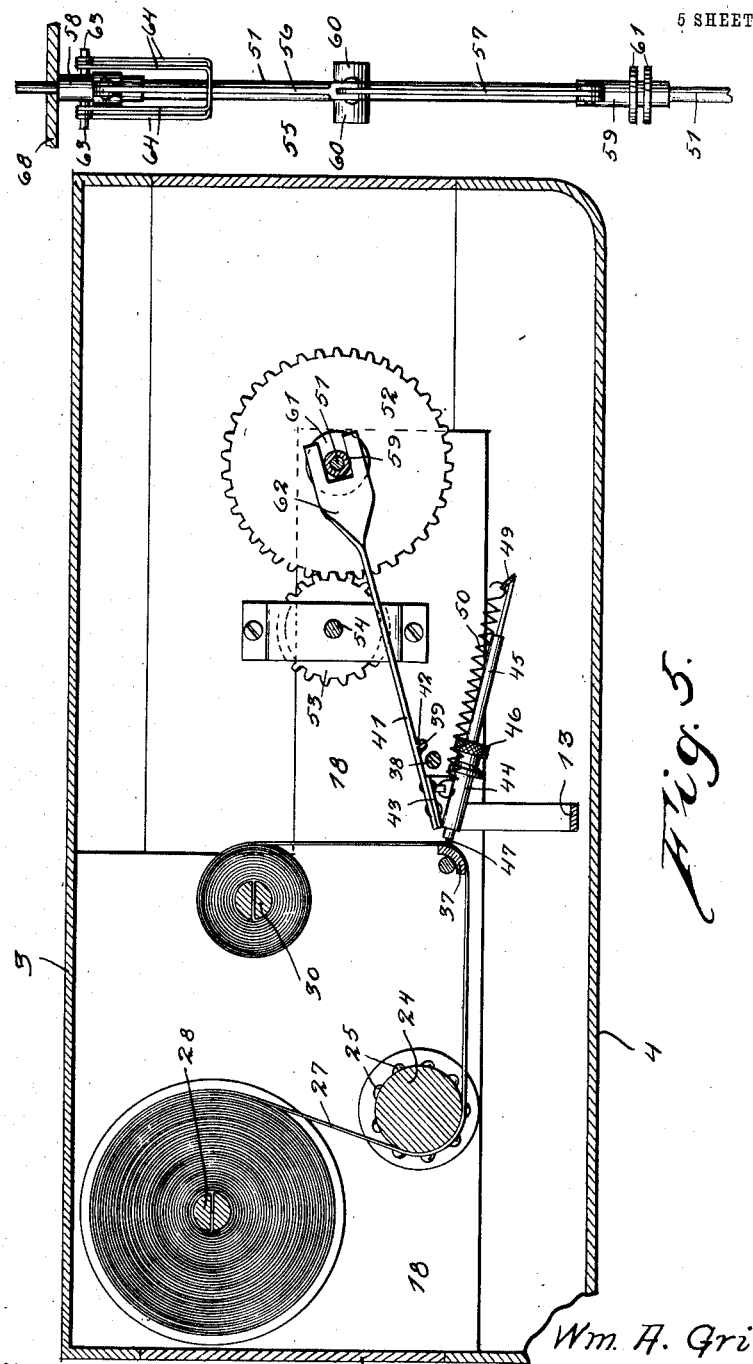

W. A. GRISWOLD.
SPEED AND DISTANCE INDICATING AND RECORDING DEVICE.
APPLICATION FILED OCT. 31, 1911.
1,043,825.
Patented Nov. 12, 1912.
5 SHEETS—SHEET 5.
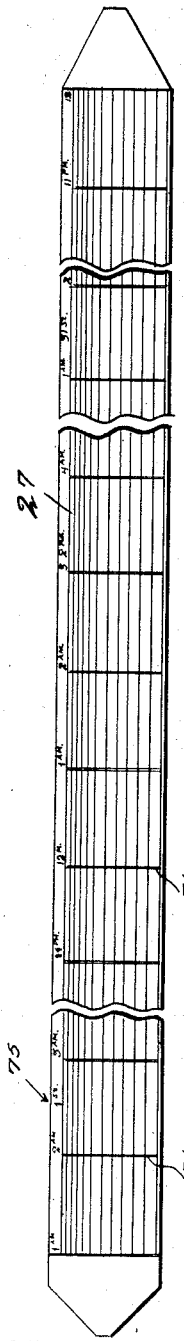
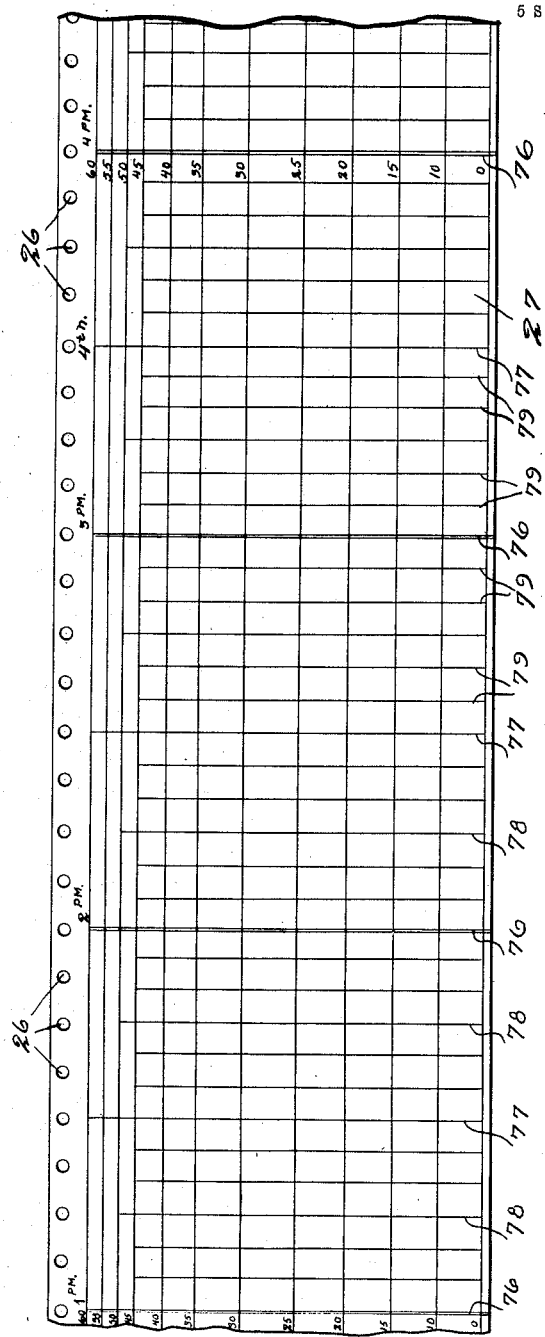

UNITED STATES PATENT OFFICE.

WILLIAM A. GRISWOLD, OF SHARON, OHIO.

SPEED AND DISTANCE INDICATING AND RECORDING DEVICE.

1,043,825.  Specification of Letters Patent.  Patented Nov. 12, 1912.

Application filed October 31, 1911. Serial No. 657,885.

*To all whom it may concern:*

Be it known that I, WILLIAM A. GRISWOLD, a citizen of the United States, residing at Sharon, in the county of Medina and State of Ohio, have invented certain new and useful Improvements in Speed and Distance Indicating and Recording Devices, of which the following is a specification.

The present invention relates to a combined clock and speed and distance indicating and recording device.

An important object of my invention is to provide means of the above mentioned character, whereby the speed of an automobile or other vehicle may be accurately recorded with respect to the time, so that the exact speed at any given time during the travel may be ascertained.

A further object of this invention is to provide a device of the above mentioned character, which is compact in arrangement of parts, so that the device will occupy the minimum amount of space, neat in appearance, and reliable in operation.

A further object of my invention is to provide novel means for connecting the marking device with the centrifugal governor.

A further object of my invention is to provide novel means for effecting a time controlled travel of the record sheet.

A further object of this invention is to provide a novel form of centrifugal governor included in the recording mechanism, whereby the record obtained will be accurate.

A further object of my invention is to combine in a single machine, a clock, speed recorder with relation to the time, a speedometer, and odometer.

Other objects and advantages of the present invention will be apparent during the course of the following description.

In the accompanying drawings forming a part of this specification, and in which like numerals are employed to designate like parts throughout the same, Figure 1 is a side elevation of the entire device with the cover closed, Fig. 2 is a similar view with the cover removed, showing the internal mechanism, Fig. 3 is a horizontal sectional view taken on line 3—3 of Fig. 2, Fig. 4 is a detail section through the marking device, Fig. 5 is a horizontal section taken on line 5—5 of Fig. 2, Fig. 6 is an edge view of the centrifugal governor, Fig. 7 is a fragmentary plan view of an entire record sheet, and, Fig. 8 is an enlarged section of the same.

In the drawings wherein is illustrated a preferred embodiment of my invention, the numeral 1 designates a casing as a whole, preferably comprising an intermediate or body portion 2, having rear and forward covers or lids 3 and 4, hinged thereto, as shown at 5. Any suitable means may be employed to hold these covers or lids in their closed position. The forward cover or lid 4 is provided with an opening for receiving a clock dial 6, of the ordinary construction. The ordinary hour and minute hands 7 and 8 are provided, which are moved by the ordinary form of clockworks to be referred to. The dial 6 is covered by a lid comprising an annular frame 9 holding a section of glass 10 or other transparent material. The lid comprising the frame 9 is hinged to the forward lid 4, as shown at 11, whereby said lid may be opened and closed, suitable means being provided to detachably hold the same in its closed position. The lid 4 is further provided near the dial 6 with an opening 12, preferably spanned by a section of glass or other transparent material, and through which is seen a vertically movable scale 13. An arrow 14 or other stationary indicator is formed upon the lid 4 adjacent the opening 12, as shown, to coöperate with the scale 13. The forward cover or lid 4 is provided preferably near its upper right hand corner with an opening spanned by a section of transparent material 15, through which are seen figures 16 of an odometer 17 of any well known or preferred type.

Disposed within the casing 1 is a metal framework 18, preferably removably mounted therein. This frame-work holds clockworks 19 including a shaft 20 which operates the minute hand 8. Rigidly mounted upon the shaft 20 is a bevel-gear 21, engaging a bevel-gear 22, which is rigidly mounted upon a vertical shaft 23, as shown. Rigidly mounted upon the shaft 23 is a feed spool or drum 24, provided near one end thereof with teeth or prongs 25, to engage within perforations 26 formed through the longitudinal edge of a record sheet 27. The preferred detail of construction of this record sheet will be given hereinafter.

The numeral 28 designates a carrying spool, which is mounted upon a vertical shaft 29, suitably journaled through portions of the frame-work 18. The numeral 30 designates a take-up spool or drum, which is rigidly mounted upon a shaft 31, vertically disposed and carrying at its upper end a bevel-gear 32, as shown. This bevel-gear is driven by a bevel-gear 33, which in turn is rigidly connected with a shaft 34. The shaft 34 receives its rotation from a spring motor including a spring 35, having connection with the shaft 34 through the medium of gears 36, as shown. It is thus seen that the take-up spool 30 will wind up the record sheet 27 and that the longitudinal movement of the record sheet is controlled by the rotation of the feed spool 24. The function of the teeth 25 carried by this feed spool, is to prevent the record-sheet 27 from slipping thereon. As clearly shown in Fig. 5, the record sheet 27 passes over a fixed guide 37, and is engaged adjacent it by a marking device to be described.

A vertically disposed shaft 38 extends near and parallel with the take-up spool 30, as shown in Fig. 2, and is rigidly connected with the frame-work 18. A slide rod 39 is provided near its ends with sockets 40, which receive the fixed shaft 38 and travel longitudinally thereof. A horizontal arm 41 extends behind the slide rod 39 and the fixed rod 38 and is soldered or otherwise rigidly connected with said slide rod, as shown at 42 but has no connection with the fixed rod 38. Rigidly connected with the end of the arm 41 that is adjacent the take-up spool 30, is a vertically disposed plate 43, upon the lower end of which is rigidly mounted a sleeve or tube 44, included in the marking device. This sleeve or tube may preferably be soldered to the plate 43. I have shown this marking device more clearly in Fig. 4, wherein the numeral 45 designates a removable inner sleeve fitting in the outer sleeve 44, which outer sleeve is rigidly connected with the plate 43, as above stated. The outer sleeve 44 has one end portion thereof tapered and split, as shown, the same being externally screw-threaded for receiving a clamping nut 46. It is thus seen that by proper manipulation of the nut 46 the sleeve 45 may be rigidly locked within the sleeve 44. Slidably mounted within the tube or sleeve 45 is an element 47 preferably formed of indelible graphite. This element 47 is held in engagement with the record sheet 27 by a push-pin 48, disposed within the sleeve 45 and having its outer end looped, as shown at 49, for connection with a retractile coil spring 50, the opposite end of which is connected with the plate 43, as shown. Attention is called to the fact that the element 47 engages the record sheet 27 at the point of engagement that said record sheet has with the fixed guide 37.

Disposed to one side of the fixed shaft 38 is a rotatable shaft 51, vertically disposed and extending in parallel relation to said shaft 38, as shown. This shaft is journaled through suitable bearings supported by the frame-work 18. The shaft 51 receives its rotation from a gear 52, which is driven by a gear 53, rigidly mounted upon a shaft 54. The shaft 54 may have suitable connection with a flexible driving shaft (not shown) which is properly geared to the wheel of the automobile or other vehicle.

The numeral 55 designates a centrifugal governor, comprising links 56 and 57, having their outer ends pivotally connected with sleeves 58 and 59, respectively. The adjacent ends of the links 56 and 57 are pivotally connected with weights 60. The sleeve 59 is loosely mounted upon the shaft 51 and is capable of moving longitudinally thereof. This sleeve 59 is provided with spaced flanges 61, between which is disposed the forked end 62 of the arm 41. The sleeve 58 is rigidly mounted upon the shaft 51 and carries oppositely extending pins 63, which in turn carry spring yokes 64, portions of the material of said spring yokes being coiled about the pins 63. Attention is called to the fact that the links 56 do not engage the spring yokes 64 until said links have moved upwardly a considerable distance, which is caused by the increased speed of the centrifugal governor.

The shaft 51 is provided at its upper end with a worm 65, engaging a worm-wheel 66, rigidly mounted upon a shaft 67 which is journaled through bearings supported by a plate 68. This plate is connected with the casing 1 and with the frame-work 18. The upper end of the shaft 51 is journaled through plate 68. Rigidly mounted upon the shaft 67 is a bevel-gear 69, engaged by a smaller bevel-gear 70 carried by a shaft 71. At its opposite end, the shaft 71 has a bevel-gear 72 rigidly connected therewith engaging a bevel-gear 73, which drives the internal mechanism of the odometer 17.

The scale 13 is ruled or marked to indicate figures from zero to sixty, to represent the number of miles per hour that the automobile or other vehicle is traveling. Attention is called to the fact that the spaces between the marks designated by the numbers decrease toward the lower end of the scale 13. This is done so that the horizontal or speed markings of the scale 13 will correspond to the horizontal or speed markings of the record sheet 27, as will be apparent hereinafter. The scale 13 is soldered or otherwise rigidly connected with the sleeve 44 and has connection near its opposite end with an arm 74, rigidly attached to the slide rod 39.

Attention is now called more particularly to Figs. 7 and 8, wherein is shown in detail the record sheet 27. I preferably construct the record sheet so that it may be employed for a month. In this case a section of the record sheet is indicated by "1st" as shown at 75, indicating that this portion of the record sheet is to be employed on the first day of the month. Other day sections are correspondingly designated. Each day section is divided by vertical hour lines 76, there being twelve a. m. hour sections and twelve p. m. hour sections. Each hour section is sub-divided into half-hour sections by a vertical half-hour line 77. Each half-hour section is subdivided into quarter-hour sections by vertical quarter-hour lines 78. Each quarter-hour section is subdivided into five-minute sections by vertical five-minute lines 79. In practice I may print the lines 76, 77, 78 and 79 in different colors so that they may be more readily distinguished.

The record sheet 27 is provided with horizontal speed lines, designated by the numerals 0, 10, 15, 20, 25, etc., as shown. Attention is called to the fact that the spaces between the horizontal speed lines decrease gradually toward the upper edge of the record sheet, in a corresponding manner to the decrease of space between the lines of the scale 13, except that the decrease of the spaces between the lines of the scale 13 is toward the opposite end of the record sheet.

The operation of the entire apparatus is as follows:—The shaft 54 being properly geared with the wheel of the automobile or other vehicle receives its rotation therefrom, which rotation is imparted to the shaft 51. The shaft 51 being vertically disposed, the centrifugal governor 55 is controlled by gravity. The rotation of the shaft 51 causes the weights 60 to move outwardly and through the medium of links 57 effect an upward movement of the sleeve 39 along the shaft 51. The arm 41 is accordingly elevated carrying with it slide rod 39 and plate 43. The scale 13 is moved upwardly and the operator can observe through the opening 12 the rate of speed of the vehicle. The marking device including the lead element 47 is caused to travel with the plate 43 and marks upon the record sheet 27 the graphic line. The horizontal speed lines of the record sheet indicate with relation to the graphic line the speed at which the vehicle travels. The clockworks turn the feed spool or drum 24 at such a speed that the space between two of the lines 79 of the record sheet is advanced every five minutes. The take-up spool 30 is turned by the spring motor to wind up the record sheet 27 in accordance with the speed at which the same is fed by the spool 24. The vertical times lines coöperate with the graphic line to indicate at what time a certain speed is obtained. When the speed of the shaft 51 is increased greatly the links 56 are moved upwardly to engage the spring elements 64 and it is obvious that the upward movement of said links 56 is opposed by both gravitation and the springs 64. For this reason the space between the horizontal speed lines of the record sheet are decreased toward the upper edge of said record sheet and for the same reason the space between the lines on the scale 13 is decreased toward the lower end of said scale. The rotation of the shaft 51 is imparted to the gear 73 which operates the internal mechanism of the odometer 17.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. In a device of the character described, an upstanding rotatable shaft, a centrifugal governor carried thereby and including an upper sleeve rigidly connected with the rotatable shaft and a lower sleeve loosely mounted thereon, means including clockworks for advancing a record sheet, marking means to engage the record sheet, connecting means between said marking means and said lower sleeve, whereby said marking means is automatically moved by the centrifugal governor, a scale connected with the marking means for movement therewith, and stationary means to coöperate with the scale to point to figures thereon.

2. In a device of the character described, an upstanding shaft, a centrifugal governor carried thereby, including weighted swinging arms adapted to move in a substantially vertical plane, a spring carried by the shaft and normally spaced from the arms and engaging said arms only when they are swung upwardly by centrifugal force when the device is operated very quickly, whereby said swinging arms are controlled during the first part of their travel by gravity and hence their operation is accurate and sensitive, means for advancing a record sheet, and marking means operated by the centrifugal governor.

In testimony whereof I affix my signature in presence of two witnesses.

WILLIAM A. GRISWOLD.

Witnesses:
 FRANK E. REAM,
 JOHN C. FRANK.